Figure 1:
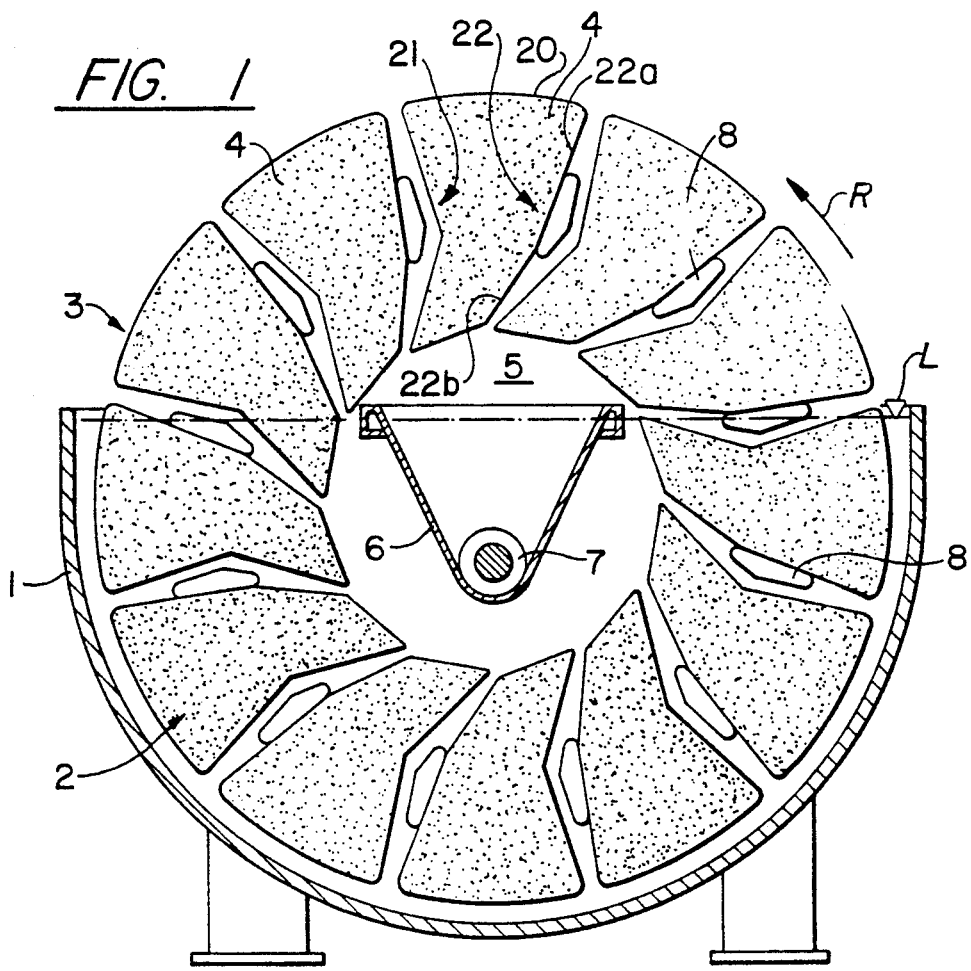

United States Patent [19]
Nilsson

[11] Patent Number: 5,273,651
[45] Date of Patent: Dec. 28, 1993

[54] DISC FILTER

[76] Inventor: Harry Nilsson, Hauptstrasse 58, CH-8274 Tägerwilen, Switzerland

[21] Appl. No.: 923,918
[22] PCT Filed: Feb. 26, 1991
[86] PCT No.: PCT/SE91/00153
§ 371 Date: Aug. 26, 1992
§ 102(e) Date: Aug. 26, 1992
[87] PCT Pub. No.: WO91/12872
PCT Pub. Date: Sep. 5, 1991

[30] Foreign Application Priority Data
Feb. 26, 1990 [SE] Sweden .............................. 9000685-9

[51] Int. Cl.⁵ ............................................. B01D 33/09
[52] U.S. Cl. .................... 210/331; 210/404; 210/486
[58] Field of Search ............... 210/331, 345, 346, 347, 210/386, 402, 403, 404, 486

[56] References Cited
U.S. PATENT DOCUMENTS
4,056,473 11/1977 Nilsson .
4,634,529 1/1987 Nilsson .
4,678,575 7/1987 Frykhult .
4,931,179 6/1990 Nilsson .................. 210/404

FOREIGN PATENT DOCUMENTS
0447208 11/1986 Sweden .
0297074 12/1988 European Pat. Off. .
WO8810144 12/1988 PCT Intl. App. .

Primary Examiner—Robert A. Dawson
Assistant Examiner—W. L. Millard
Attorney, Agent, or Firm—Quarles & Brady

[57] ABSTRACT

A disc filter including at least one filter disc (3) partly submerged in a vessel (1) for liquid or suspension to be filtered, said filter disc including a plurality of substantially annularly disposed filter sectors (4) and being rotatable about a collecting through (6) for solid substance deposited on the outside of the filter sectors (4) and falling down therefrom. Each filter sector has a filtrate outlet (16) by means of which the interior of the filter sector communicates with an axial channel (8) for discharge of filtrate. The filtrate outlet (16) is arranged at the edge (22) of the filter sector (4) trailing upon rotation of the filter disc and being connected to the side (12) of the axial channel (8) leading in the direction of rotation. Hereby the filter sectors (4) may be arranged to extend radially outside as well as radially inside the axial channels (8).

11 Claims, 3 Drawing Sheets

DISC FILTER

The present invention concerns an arrangement in a disc filter including at least one filter disc partly submerged in a vessel for liquid or suspension to be filtered, said filter disc including a plurality of substantially annularly disposed filter sectors and being rotatable about a collecting trough for solid substance deposited on the outside of the filter sectors and falling down therefrom, each filter sector having a filtrate outlet by means of which the interior of the filter sector communicates with an axial channel for discharge of filtrate, and said filtrate outlet being arranged at the edge of the filter sector trailing upon rotation of filter disc and being connected to the side of the axial channel leading in the direction of rotation.

Filters of this kind are mainly used in cellulose and pulp industry for thickening fiber suspensions and for cleaning process water, so called fiber recovery.

For such use large filter areas are necessary and, thus, filters comprising several parallel filter discs are common.

Of the kind initially stated there have hitherto existed two main types.

In the first, older type, described in U.S. Pat. No. 4,056,473, the axial channels are centrally arranged and form, together with cross-channels extending between the axial channels, part of the annular rotor surrounding the collecting trough. The filter sectors, being carried by and communicating with each one cross channel in turn communicating with an axial channel, extend substantially radially and approximately fan-like outwards from the rotor. On one hand the rotor must have a certain minimum diameter to accommodate an appropriate collecting trough, while on the other hand as small a rotor diameter (i.e., the inner diameter of the filter disc) as possible is desirable to obtain the largest possible filter area without the outer diameter of the filter disc becoming much too large. Particularly when there is a small central opening in a filter disc of this kind the problem exists that solid substance falling down from the filter sector may be entirely or partly hanging on the axial channel trailing in the direction of rotation, since the axial channels, due to the shape of the filter sectors tapering towards the center, are relatively closely arranged. In order to overcome this problem it has been suggested, according to SE-B8301652-7, corresponding to U.S. Pat. No. 4,678,575, that the axial channels be arranged in groups of at least two and that adjacent filter sectors shall communicate with one each of these axial channels by each one cross-channel. Although hereby has been created a greater space between adjacent groups of axial channels this is still not enough to ensure that solid substance falling from the filter sectors shall avoid to be trapped on the axial channels. Further, from a purely constructional and manufactural point of view, the grouping of the axial channels as well as the connection of the cross-channels to the axial channels make a filter of this kind both complicated and expensive.

In the other kind of filter, represented by the filter according to SE-B-8305817-2, corresponding to U.S. Pat. No. 4,634,529 and EP-B1-016069, the axial channels are arranged at the outer circumference of each filter disc. Hereby, the central opening of the filter is entirely free from every obstacle for solid substance falling from the filter sectors. In practice, and according to SE-B-8702620-9, corresponding to WO 88/10144, such a filter is also made with cross-channels comprising sections of an annular channel arranged at the outer periphery of a filter disc, each such section communicating with an axial channel. One problem with filters of this second kind is that the rotor diameter becomes very large when a great filtering capacity is desired, which, in practice, puts a limit to the largest diameter of the filter disc and thereby for great filtering capacities, particularly for transport reasons.

A combination of the two filter types mentioned, i.e, provision of a filter having filter sectors extending radially outward of as well as radially inward of the axial channels hitherto has not been possible eliminating the respective drawbacks. This relates to removal of the filter cake deposited on a filter sector. Such removal is initiated at the outer periphery of a filter disc in that a water jet is directed obliquely against the filter sectors in a certain position of rotation of the filter disc. The water jet loosens a portion of the filter cake from a filter sector, whereafter the filter cake continuously "rolls" off the filter sector in one integral piece. In the combination mentioned attachment of a filter sector to a cross-channel would result in that the filter cake at removal would break at the cross-channel and, thus, remain radially inward thereof and would be practically impossible to remove thereafter, which in turn would result in that the portion of the filter sector located radially inwardly of the cross-channel would be blocked for further use.

The object of the present invention is to set aside the problems of the known filters by creating a filter without cross-channels still having optimum filtering capacity, i.e., largest possible filter area having smallest possible outer diameter without the opening diameter of a filter disc for that reason being too small.

This has been achieved in that the present invention has been given the characteristics of the annexed claims.

By the fact that the filtrate outlet, in manner known per se through SE-B-447 208, is arranged at the edge of the filter sector trailing on rotation of the filter disc and connected to the side of the axial channel leading in the direction of rotation, cross-channels are avoided, whereby is obtained an integral filter cake which may be removed in one piece without problem even when a filter sector according to claim 1 extends radially outward of as well as radially inward of an axial channel. Hereby the diameter of the filter disc can be made smaller for given filter area due to the fact that also the space inwardly of the axial channels can be utilized. In this case the filter cake will not be hanging on a trailing axial channel because the radial extension of the sector outside the sector is less than if the sector would extend only radially outwards from an axial channel. Therefore, the falling distance of a fiber cake radially inwards towards the path of moment of the axial channels becomes so short that the trailing axial channel being advanced towards the falling path of the fiber cake due to the rotation will not be advanced so far that it risks to be hit by the falling fiber cake.

Figure 2:
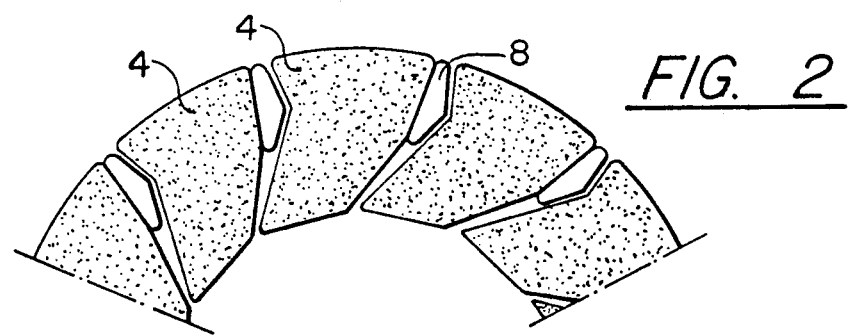
Figure 3:
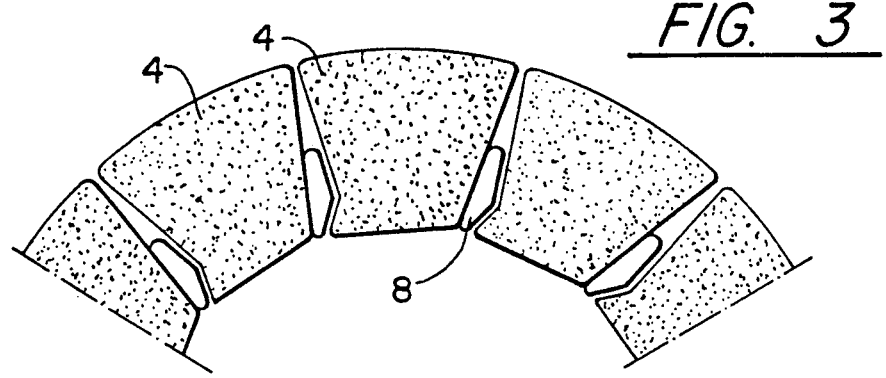
Figure 4:
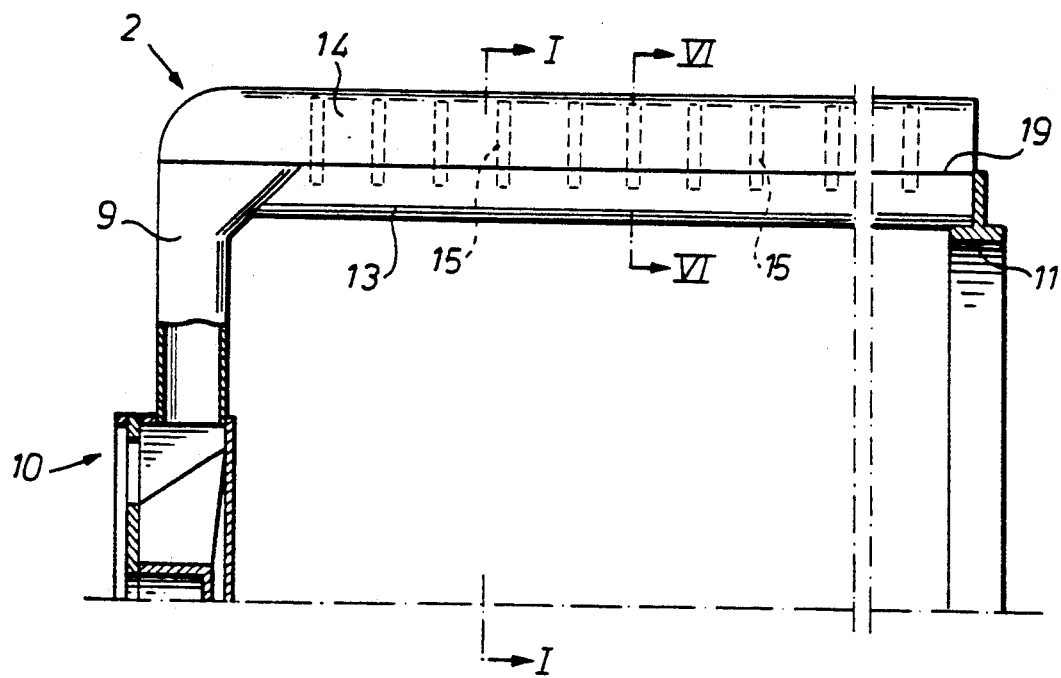
Figure 5:
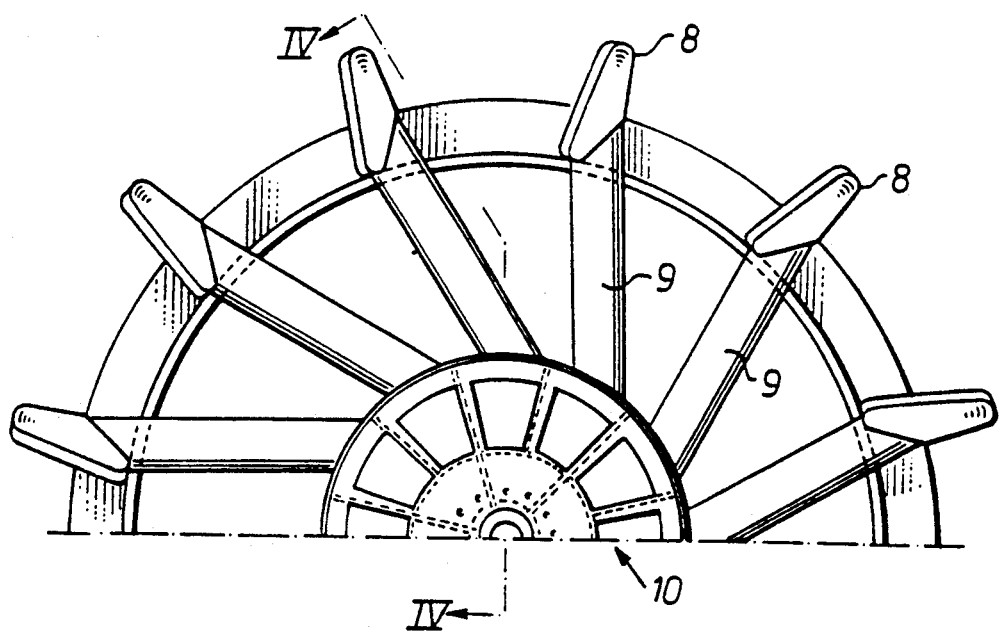
Figure 6:
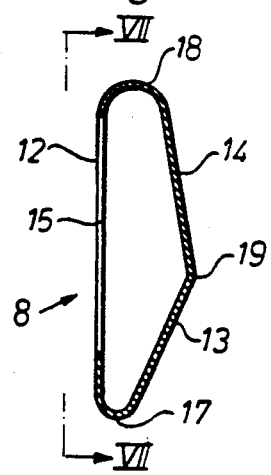
Figure 7:
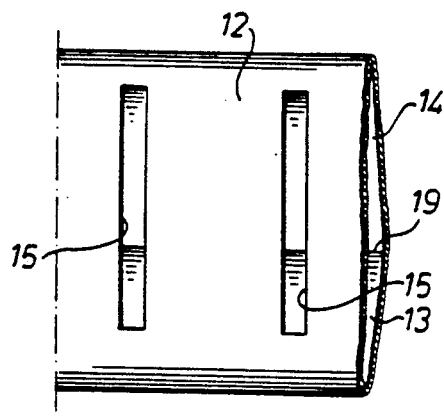
Figure 8:
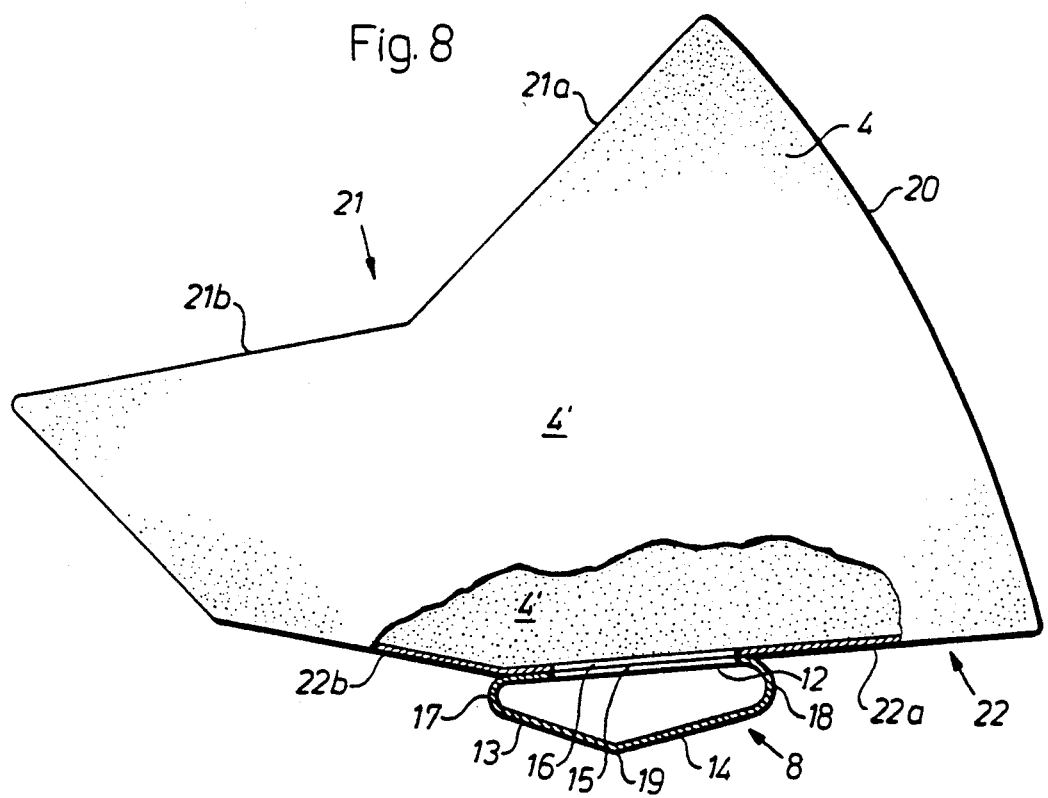

The invention will be described hereinafter reference being made to the annexed drawings, wherein FIG. 1 is a cross-section along line I—I of FIG. 4 through a filter arranged according to a preferred embodiment of the invention, FIG. 2 shows a portion of a filter disc having another arrangement of the filter sectors, FIG. 3 shows a portion of a filter sector having still another arrangement of the filter sectors, FIG. 4 is a section along line IV—IV of FIG. 5 through a filter according to FIG. 1 but without filter sectors, FIG. 5 shows a view of the filter according to FIGS. 1 and 4 seen from the left of FIG. 4, likewise without filter sectors, FIG. 6 is a section at a larger scale through an axial filtrate conduit along line VI—VI of FIG. 4, FIG. 7 shows a view of a portion of an axial filtrate conduit seen along line VII-VII of FIG. 6, and FIG. 8 shows a detail at an enlarged scale of a filter sector and a corresponding axial filtrate conduit.

In a vessel 1 for suspension or other liquid to be filtered a filter rotate 2 is partly submerged under the liquid level L, and rotate including a plurality of filter discs 3. Each filter disc 3 in turn includes a plurality of filter sectors 4 annularly disposed such that an opening 5 is formed in the center thereof. Through the openings 5 of all filter discs is introduced a collecting trough 6 intended to catch solid substance falling down from the filter sectors. At the bottom of the collecting trough 6 is arranged a discharge screw 7 for removal of solid substance collected in the through.

For rotation of the filter rotor 2 in the direction of rotation indicated with an arrow R is arranged a non-shown drive.

In a conventional manner each filter sector 4 has two spaced layers of filter cloth 4' and corresponding filtering means through which the liquid contained in vessel 1 is filtered. Hereby, solid substance is deposited on the outside of the filtering means while filtrate flows therethrough to the interior of the filter sector. For discharge of filtrate from the interior of the filter sectors there are axial filtrate conduits 8, which, through substantially radial filtrate conduits 9, lead to a central outlet 10 at one end of the filter. The axial filtrate conduits 8 as well as the substantially radial filtrate conduits 9 form parts of the filter rotor 2 and make up its structural body carrying the filter sectors 4. The number of axial filtrate conduits 8 corresponds to the number of filter sectors 4 of each filter disc 3, to each axial filtrate conduit being after each other connected one filter sector of each filter disc. The outlet 10 is of the common rotating kind and is adapted to successively put the radial filtrate conduit 9 and thereby the axial filtrate conduits 8 in connection with a non-shown source of under-pressure. In the end turned away from outlet 10 the axial filtrate conduits are connected to a circular support ring 11 against the inside of which run non-shown support means for the filter rotor.

As initially stated, in conventional rotating filters each filter sector is connected to an axial filtrate conduit through a circumferentially directed cross-channel. In contrast, according to the present invention, each filter sector 4 is connected with its edge trailing in the direction of rotation to an axial filtrate conduit 8. This connection is arranged on a portion of the axial filtrate conduit turned substantially upwards at rotation of the filter rotor when the axial filtrate conduit raises above the liquid surface L. This arrangement has enabled mounting of filter sectors such that they extend radially inwards (FIG. 2), radially outwards (FIG. 3) or at the same time radially inwards and outwards (FIG. 1) from the axial filtrate conduit 8.

Suitably, the axial filtrate conduits 8 have the cross-sectional shape best appearing from FIGS. 6 and 8, i.e., substantially triangular having a longer side 12 and two shorter sides 13 and 14. In the longer side 12, which is turned upwards when the axial filtrate conduit raises above the liquid level L, is arranged a number of openings 15 corresponding to the number of filter discs. In a manner not closer shown a filter sector 4 is mounted against each such opening 15 such that its interior communicates with the interior of the axial filtrate conduit 8 in question through a corresponding opening 16 (FIG. 8) in a trailing edge of the filter sector. The longer side 12 provides a relatively long distance of connection for a filter sector and thereby a large area of opening 15 as well as a stable attachment of the filter sector. The longer side 12 merges into the shorter sides 13 and 14 through curved surfaces 17 and 18, such that a large interior cross-section is created. The shorter sides 13 and 14 are interconnected by a tip 19 which is turned substantially downwards when the axial filtrate conduit raises above the liquid level L. Hereby has been created a channel having two sides 13 and 14 inclining towards the tip 19.

As mentioned, with the arrangement now described the filter sector may be mounted such that it extends either radially inwards or radially outwards from the axial filtrate conduit. With particular advantage, however, filter sectors can be used which according to FIG. 1 extend radially inwards as well as radially outwards from the axial filtrate conduits.

Such a filter sector is shown separately in FIG. 8 together with a corresponding axial filtrate conduit 8. In a conventional manner this filter sector 4 has an outer arcuate edge 20 from which an edge 21 foremost in the rotational direction and an edge 22 aftmost or trailing in the direction of rotation extend towards the center. According to the present invention the trailing edge 22 is divided in a radially outer straight edge portion 22a and a radially inner likewise straight edge portion 22b. The edge portions 22a and 22b form such an angle that these edge portions incline downwards towards the axial filtrate conduit 8 to which the filter sector in question is connected when this filter sector and its corresponding axial filtrate conduit raise above the liquid level L. This appears clearly from FIG. 1, where an axial filtrate conduit 8 is just about to leave the liquid surface. The filter sector shown in FIG. 8 is viewed in substantially the same position. In the example shown the outer edge portions 22a of the filter sectors are provided with outlets 16 and connected to the openings 15 of the axial filtrate conduits 8. From FIG. 1 clearly appears also that the entire filter sector in question has raised above the liquid surface L, i.e., that no further supply of filtrate can take place, at the same time as the axial filtrate conduit 8 has the shorter sides 13 and 14 of its cross-section inclining downwards towards the lowest portions of a filtrate conduit, viz., the tip 19. Hereby is ensured a complete emptying of the filter sector before it has rotated so far that filtrate may flow radially inwards and re-wet the solid substance deposited on the filter sector.

In adaption to a leading axial filtrate conduit 8 also the edges 21 of the filter sectors 4 leading in the rotational direction comprise two mutually angled portions 21a and 21b (FIG. 8).

For facilitating the outflow of filtrate from the axial filtrate conduits 8 these incline downwards towards the radial filtrate conduits 9 during a part of rotation, viz., from somewhat before the corresponding filter sector raises above the liquid level L to somewhat after the axial filtrate conduit in question has raised above the liquid level (FIG. 5). The inclination is as largest approximately when the axial filtrate conduit passes the liquid level (FIG. 1). As appears from FIG. 5 also the radial filtrate conduits 9 incline downwards towards the outlet 10 in corresponding rotational positions.

I claim:

1. A disc filter including at least one filter disc (3) partly submerged in a vessel (1) for liquid or suspension to be filtered, said filter disc including a plurality of substantially annularly disposed filter sectors (4) and being rotatable about a collecting trough (6) for solid substance deposited on the outside of the filter sectors (4) and falling down therefrom, each filter sector having a filtrate outlet (16) by means of which the interior of the filter sector communicates with an axial channel (8) for discharge of filtrate, and said filtrate outlet (16) being arranged at the edge (22) of the filter sector (4) trailing upon rotation of the filter disc and being connected to the side (12) of the axial channel leading in the direction of rotation, characterized in that the filter sectors (4) extend radially outside as well as radially inside the axial channels (8).

2. Disc filter according to claim 1, characterized in that the edge (22) of each filter sector (4) trailing in the direction of rotation include two edge portions (22a,22b) forming an angle.

3. Disc filter according to claim 2, characterized in that the two edge portions (22a,22b) incline towards a filtrate opening (15) in the axial channel (8) when the trailing edge (22) of the filter sector raises above the liquid level (L) in the vessel (6).

4. Disc filter according to claim 1, wherein each axial channel (8) has a substantially triangular cross-section having a longer triangle side (12) and two shorter triangle sides (13,14), characterized in that the trailing edge (22) of the filter sector (4) is connected to the longer triangle side (12) in which is arranged an opening (15) corresponding to the filtrate outlet (16) of the filter sector (4).

5. Disc filter according to claim 1, characterized in that the axial channels (8) incline downwards towards the outlet (10) of the filter in rotational positions where the corresponding filter sector (4) raises above the liquid level (L) and a portion thereafter.

6. Disc filter according to claim 5, characterized in that a substantially radially directed channel (9) connected to each axial channel (8) and in turn being connected to the outlet (10) of the filter inclines downwards towards the outlet (10) in said rotational positions.

7. Disc filter according to claim 2, wherein each axial channel (8) has a substantially triangular cross-section having a longer triangle side (12) and two shorter triangle sides (13, 14), characterized in that the trailing edge (22) of the filter sector (4) is connected to the longer triangle side (12) in which is arranged an opening (15) corresponding to the filtrate outlet (16) of the filter sector (4).

8. Disc filter according to claim 3, wherein each axial channel (8) has a substantially triangular cross-section having a longer triangle side (12) and two shorter triangle sides (13, 14), characterized in that the trailing edge (22) of the filter sector (4) is connected to the longer triangle side (12) in which is arranged an opening (15) corresponding to the filtrate outlet (16) of the filter sector (4).

9. Disc filter according to claim 2, characterized in that the axial channels (8) incline downwards towards the outlet (10) of the filter in rotational positions where the corresponding filter sector (4) raises above the liquid level (L) and a portion thereafter.

10. Disc filter according to claim 3, characterized in that the axial channels (8) incline downwards towards the outlet (10) of the filter in rotational positions where the corresponding filter sector (4) raises above the liquid level (L) and a portion thereafter.

11. Disc filter according to claim 4, characterized in that the axial channels (8) incline downwards towards the outlet (10) of the filter in rotational positions where the corresponding filter sector (4) raises above the liquid level (L) and a portion thereafter.

* * * * *